(12) United States Patent
Ito

(10) Patent No.: US 7,780,880 B2
(45) Date of Patent: Aug. 24, 2010

(54) METHOD OF MANUFACTURING A LENS

(75) Inventor: Eiji Ito, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 387 days.

(21) Appl. No.: 11/376,137

(22) Filed: Mar. 16, 2006

(65) Prior Publication Data

US 2006/0238901 A1    Oct. 26, 2006

(30) Foreign Application Priority Data

Mar. 18, 2005  (JP) ............................. P.2005-079961

(51) Int. Cl.
B29D 11/00  (2006.01)
(52) U.S. Cl. .......................... 264/2.5; 264/1.1; 264/2.2; 425/808
(58) Field of Classification Search ................. 264/1.1, 264/2.5, 2.7, 328.7, 2.2; 425/808, 190; 249/57
See application file for complete search history.

(56) References Cited

U.S. PATENT DOCUMENTS

2005/0248724 A1 * 11/2005 Jones ......................... 351/177

FOREIGN PATENT DOCUMENTS

| JP | 60-171232 A | 9/1985 |
| JP | 4-175710 A | 6/1992 |
| JP | 7-148795 A | 6/1995 |
| JP | 2002-90604 A | 3/2002 |
| TW | 479020 | * 3/2002 |

* cited by examiner

*Primary Examiner*—Mathieu D. Vargot
(74) *Attorney, Agent, or Firm*—Birch, Stewart, Kolasch & Birch, LLP

(57) ABSTRACT

A plastic lens, which does not require a modification to an inner diameter of a mirror frame but is uniform in outer diameter, is provided and include: protrusions on the circumference in at least three points divided thereof into three equal parts except for an injection gate point, in positions equally distant to a center O of the plastic lens. The protrusions have respective outer surfaces provided as fit portions to a mirror frame. The plastic lens preferably has a diameter of 50 mm or more and a thickness smallest at the center thereof.

14 Claims, 4 Drawing Sheets

METHOD OF MANUFACTURING A LENS

FIELD OF THE INVENTION

The present invention relates to plastic lens, and more particularly to a large-sized plastic lens, having a diameter of 50 mm or more, for use on a projector. It relates also to a method and apparatus for manufacturing such a plastic lens.

BACKGROUND OF THE INVENTION

Plastic lenses, generally, are produced by injection molding, injection compression molding or so. In the conventional injection molding for plastic lenses take a process, using an injection molding-machine, to inject a melt resin of a cylinder into a metal mold applied with a mold tightening force, and then take it out thereof after cooling. In injection compression molding, a melt resin is injected into a metal mold like the above, followed by cooling while compressing it at a portion inside the cavity. Injection compression molding is effective particularly for lenses having a ameter of 50 mm or more or those thick-walled (5 mm or more), and often used in molding video projector lenses and laser-scanning optical system fθ lenses. Because of the capability of molding at an injection pressure lower than the usual injection molding, plastic lenses can be produced less in inner-diameter strain but higher in accuracy (JP-A-7-148795 (page 2, FIG. 1)).

However, in the case of a plastic lens, the lens molded possibly deviates in its outer diameter from the design value due to errors, etc. caused upon making the metal mold. Where the lens molded has an outer diameter not meeting the design value, there occurs a trouble of optical-axis deviation due to a gap caused with a mirror frame to fit the lens therein or of strains induced in the lens due to excessive tightness. For this reason, where the lens outer diameter is not formed meeting the design value, it is a practice to modify the metal mold at the entire portion of the lens circumference while taking account of the deviation, and to conduct again a molding into a lens outer diameter meeting the design value.

However, the modification to the metal mold, in a manner correcting the entire circumferential form of the lens after once molding the lens, results in an increased extra process and considerably troublesome operation, thus leading to cost increase and deadline missing.

SUMMARY OF THE INVENTION

An object of an illustrative, non-limiting embodiment of the present invention to provide a plastic lens easy to modify its lens outer diameter which requires only part of the entire lens circumference instead of the entire part thereof even when requiring a modification to the metal mold, or eliminates the necessity to make such a modification. Another object of an illustrative, non-limiting embodiment of the present invention is to provide a method and apparatus for manufacturing a plastic lens easy to modify its outer diameter.

A plastic lens of an exemplary embodiment of the invention comprises: at least three protrusions on a circumference of the plastic lens except for an injection gate point, wherein the at least three protrusions divide the circumference into at least three parts, the at least three protrusions are equally distant to a center of the plastic lens, and each of the at least three protrusions has an outer surface that is a fit portion to a mirror frame.

Meanwhile, a method for manufacturing a plastic lens according to an exemplary embodiment of the invention, comprises: injecting a resin material through an injection gate in a circumference of a cavity of a metal mold for molding a lens body, into the cavity; molding protrusions in gaps communicating with the cavity, the gaps being formed at points on the circumference of the cavity by dividing the circumference at least into three equal parts, the points being in positions different from a gate-formed point; and fixing a size of each of the protrusions by previously regulating an adjusting piece.

Furthermore, an apparatus for manufacturing a plastic lens according to an exemplary embodiment of the invention, comprises: a first mold base having a first mirror piece; a second mold base having a second mirror piece; an injection gate of a resin material; a cavity communicating with the injection gate, the cavity being between a mirror surface of the first mirror piece and a mirror surface of the second mirror pieces; at least three gaps between the first and second mold base, the at least three gaps dividing an outer circumference edge of the cavity into at least three parts; and an adjusting piece in each of the at least three gaps, the adjusting piece being capable of regulating a distance to the outer circumference edge of the cavity.

According to exemplary embodiments of the invention, protrusions are provided on the circumference in at least three points divided thereof into three equal parts except for an injection gate point that are equally distant to a center of the plastic lens, the protrusions having respective outer surfaces provided as fit portions to a mirror frame. Accordingly, the protrusions in plurality are in abutment against an inner peripheral surface of the mirror frame thereby supporting the lens. Even when the lens is molded to an outer diameter not meeting a design value, modification to the metal mold can be satisfactorily done only at portions corresponding to the plurality of protrusions instead of the entire portion thereof Thus, metal mold modification is easy to perform. Furthermore, even where there is a somewhat roughening in the lens outer periphery except for the protrusions, it is satisfactory if the plurality of protrusions have an outer diameter meeting the design value. There is eliminated the necessity to provide accuracy to the metal mold entirety, molding conditions and so on.

In an exemplary method for manufacturing a plastic lens of the invention, the method includes: injecting a resin material through an injection gate in a circumference of a cavity of a metal mold for molding a lens body, into the cavity; molding protrusions in gaps communicating with the cavity, the gaps being formed at points on the circumference of the cavity by dividing the circumference at least into three equal parts, the points being in positions different from a gate-formed point; and fixing a size of each of the protrusions by previously regulating an adjusting piece. Accordingly, by regulating the adjusting pieces, distance can be provided equal of from the protrusions to the lens center. Thus, lens optical axis position can be managed with accuracy.

Furthermore, in an apparatus for manufacturing a plastic lens according to an exemplary embodiment of the invention, the apparatus includes: a first mold base having a first mirror piece; a second mold base having a second mirror piece; an injection gate of a resin material; a cavity communicating with the injection gate, the cavity being between a mirror surface of the first mirror piece and a mirror surface of the second mirror pieces; at least three gaps between the first and second mold base, the at least three gaps dividing an outer circumference edge of the cavity into at least three parts; and an adjusting piece in each of the at least three gaps, the adjusting piece being capable of regulating a distance to the outer circumference edge of the cavity. This makes it possible to manufacture a plastic lens accurate in optical-axis position, hence eliminating the need to modify the inner diameter of the mirror frame.

DETAILED DESCRIPTION OF THE INVENTION

A exemplary embodiment of the present invention will be explained below with reference to the drawings.

Figure 1:
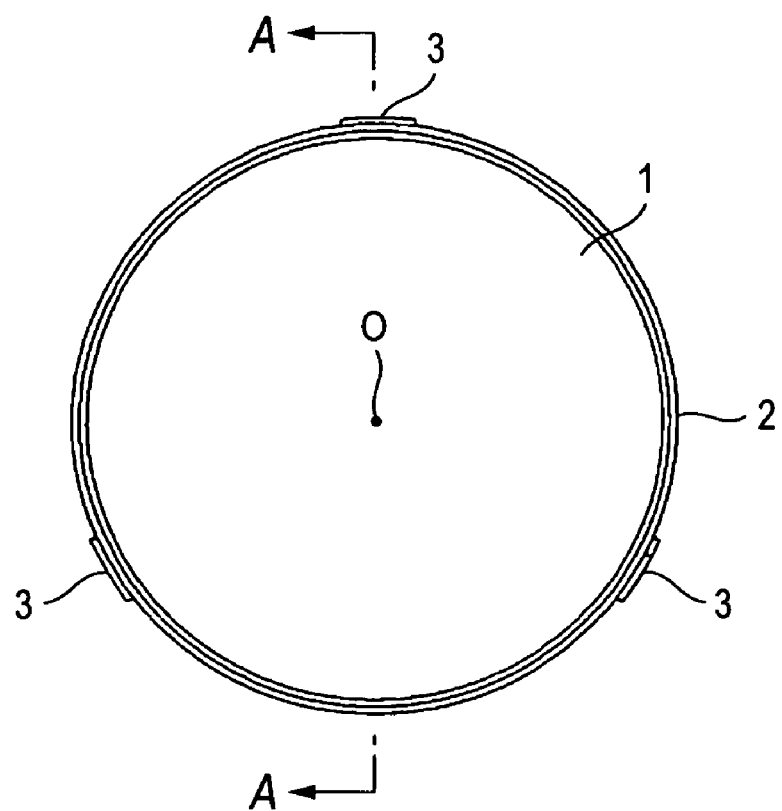
FIG. 1 is a plan view of an illustrative, non-limiting embodiment of a plastic lens according to the inveniton

FIG. 1 shows a plan view of a plastic lens, wherein a flange 2 is formed in a circumference of a lens main body 1. Protrusions 3, equally distant to the center O, are formed respectively at least three points as divisions into three equal parts of the circumference. The plastic lens is to be given a diameter of 50 to 60 mm.

Figure 2:
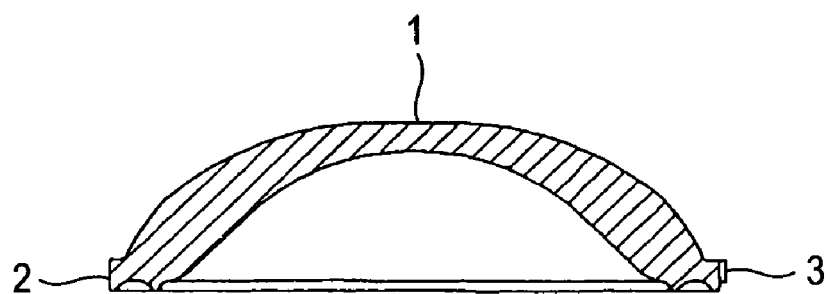
FIG. 2 is a cross-sectional view along line A-A in FIG. 1.
Figure 3:
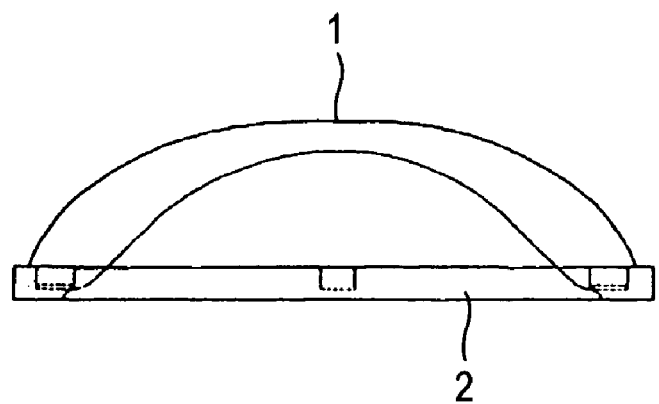
FIG. 3 is a front view of the plastic lens in FIG. 1.
Figure 4:
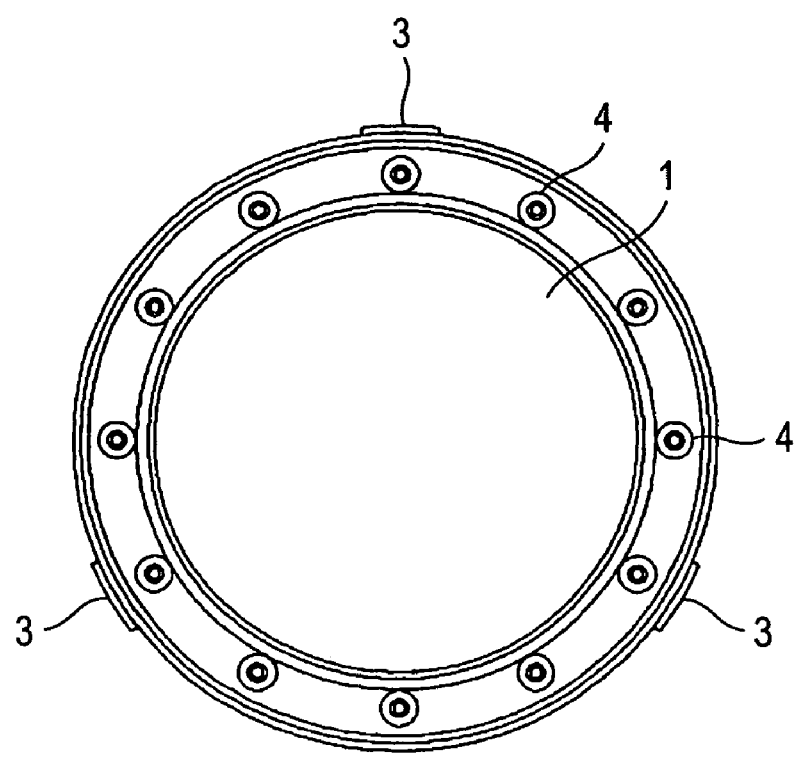
FIG. 4 is a back view of the plastic lens in FIG. 1.

FIG. 2 shows a cross-sectional view on line A-A in FIG. 1. The lens main body 1 is formed with a thickness the smallest at a center region thereof but increasing as the circumference is neared. In molding such a lens greater in aperture and having a thickness smaller in the center region but greater in the circumference, the melt resin from the injection gate flows faster in a circumferential region but slower in a center region because of its small thickness. This results in a tendency that a weld line readily occurs at a point where resin flows joins together in the circumferential region and a concavo-convex is easily formed in the circumferential region, thus readily changing the lens diameter. Design is made to form protrusions 3 at least several points on the circumference of flange 2 in the circumference of the lens main body 1 in a manner equal in distance to a lens center O. Due to this, even in case there is formed a roughening in the circumference in areas except for the protrusions 3, the present plastic lens at its protrusions 3 goes into abutment against an inner surface of the mirror frame when built into a not-shown mirror frame. This allows for optical-axis alignment. Even when the lens outer shape is not molded to a design value, it is satisfactory to modify the metal mold only at regions corresponding to the plurality of protrusions 3 instead of at the entire periphery thereof. This facilitates the modification to the metal mold. Furthermore, even where there is a somewhat roughening in the lens circumference in areas except for the protrusions 3, it is satisfactory to provide a plurality of protrusions 3 with an outer shape meeting a design-value. This eliminates the necessity of high accuracy in the metal mold entirety and molding conditions, as noted before. FIG. 3 shows a front view of the FIG. 1 lens main body 1 while FIG. 4 a bottom view thereof. The holes 4 in multiplicity, appearing in the bottom view, correspond in position to the eject pins of the metal mold.

Figure 5:
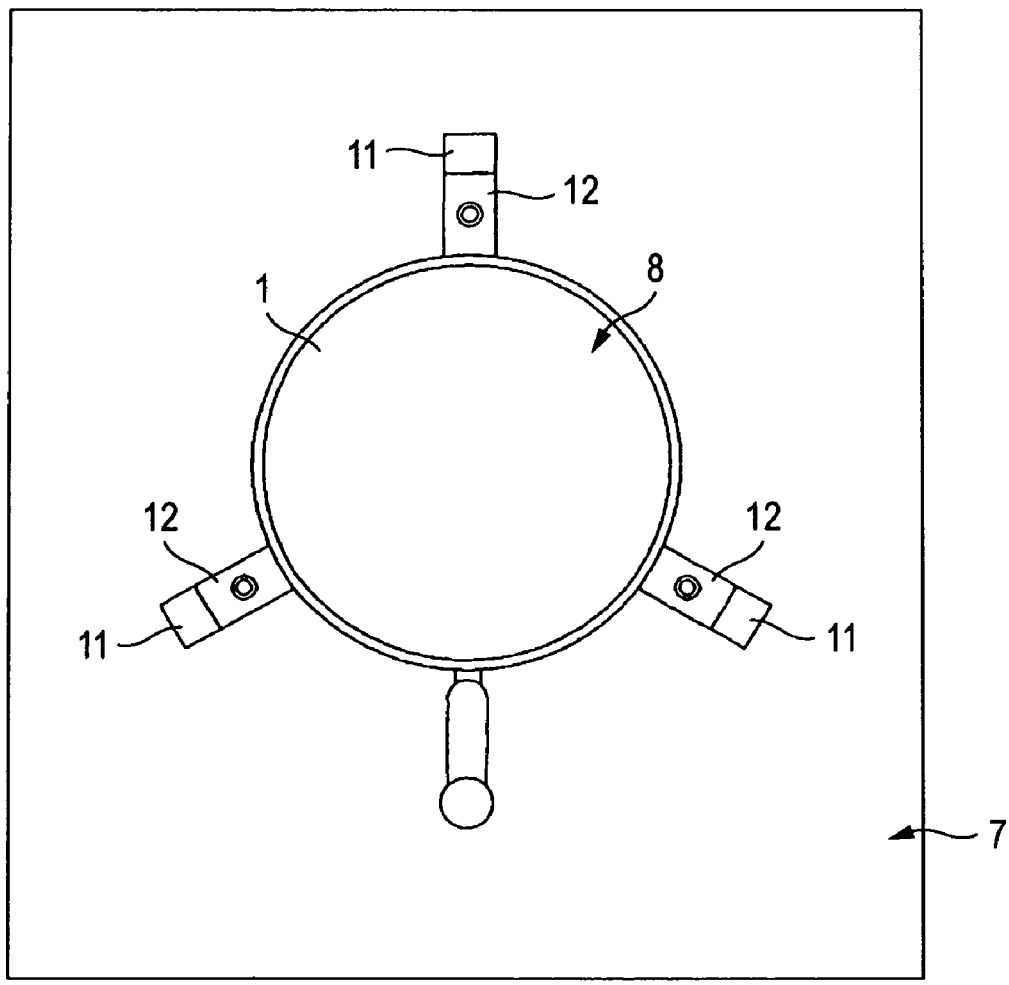
FIG. 5 is a plan view of a metal mold after molded a lens, removed of a half portion of the metal mold.
Figure 6:
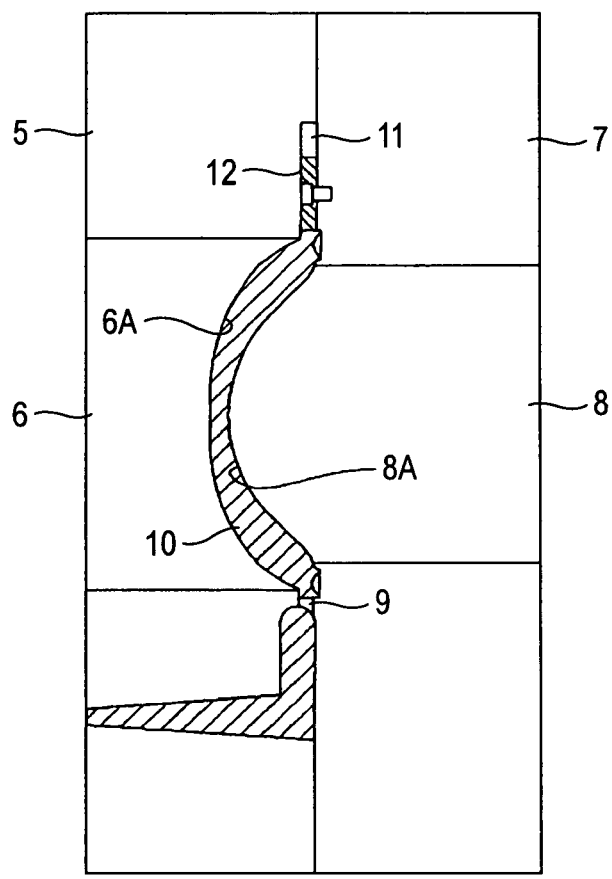
FIG. 6 is a schematic side-sectional view of the FIG. 5 metal mold.
Figure 7:
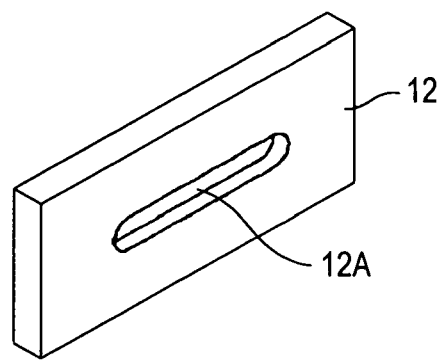
FIG. 7 is a perspective view of an adjusting piece.

FIGS. 5 and 6 show a metal mold for molding such a plastic lens. FIG. 5 shows a plan view that is removed of a first mold base 5 and a first mirror piece 6, thus showing a state a molded plastic lens rests upon the second mold base 7 and second mirror piece 8. A cavity 10, communicating with an injection gate 9, is formed between the respective mirror surfaces 6A, 8A of the first and second mirror pieces 6, 8. Gaps 11 are formed between the first and second mold bases 5, 7, at least at three points outer than the circumference of the cavity 10. Adjusting pieces 12 are respectively provided in the gaps 11, which are adjustable in the distance to the circumference of the cavity 10. The adjusting piece 12 is formed with an elongate hole 12 so that it can be fixed to the second mold base 7 by inserting a bolt in the elongate hole 12. The provision of the elongate hole 12 allows for adjusting the distance to the cavity circumference.

The process for manufacturing a plastic lens, by use of a metal mold as shown in FIGS. 5 and 6, includes a step of injecting a resin material into the cavity 10 from an injection gate 9 provided at the circumference of the mold cavity 10, a step of molding protrusions 3 in the gaps 11 formed at least three points of the circumference as divisions into three equal parts differently from the gate-formed position and communicating with the cavity 10, and a step of previously fixing a size of the protrusion 3, to form in the gaps 11, by adjusting the adjusting pieces 12. The gaps 11 can be formed at four or more points without limited to three points. Accordingly, the protrusions 3 may be formed four or more in the number. In the case the lens molded by such a process is measured for its diameter and found deviated from its design value, it must be modified. In such a case, no modification is required for the first and second mirror pieces 6, 8, i.e. it can be coped with by a mere modification to the first mold base 5. In such a case, it can be coped with merely by adjusting the position of the adjusting pieces 12 instead of reshaping the first mold base 5 by use of a machine tool. Namely, when the lens molded is greater in outer diameter than its design value, the bolts fixing the adjusting pieces 12 are respectively loosened to move the adjusting pieces 12 toward a lens center along the elongate holes 12A. The bolts A are tightened at positions where to absorb the deviation of from the design value, to thereby fix the adjusting pieces 12. In this state, molding is carried out again to make a lens having an outer diameter meeting the design value. By repeating the adjustment, the metal mold can be rearranged to such a shape that a lens can be made to the design value. This eliminates the necessity to reshape the metal mold itself by use of a machine tool. By merely adjusting the adjusting pieces 12, the outer diameter can be adjusted easily.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-79961 filed Mar. 18, 2005, the contents of which is incorporated herein by reference.

What is claimed is:
1. A method for manufacturing a plastic lens, comprising:
injecting a resin material through an injection gate in a circumference of a cavity of fixed size formed between a plurality of mold pieces of predetermined shapes of a metal mold for molding a lens body, into the cavity;
molding protrusions along the lens body circumference in gaps communicating with the cavity, the gaps being formed at points on the circumference of the cavity by dividing the circumference at least into three equal parts, the points being in positions different from a gate-formed point; and setting a size of each of the protrusions by previously regulating an adjusting piece located between two of said mold pieces of predetermined shapes, wherein said regulating is performed by moving said adjusting piece with respect to said cavity circumference to change a distance related to a protrusion size.

2. The method according to claim 1, wherein said protrusions are at locations equal in distance to a center of said lens body.

3. The method according to claim 1, wherein, when the lens outer shape is not molded to a design value, said metal mold is modified at regions corresponding to said protrusions.

4. The method according to claim 1, wherein said protrusions have an outer shape meeting a design value.

5. The method according to claim 1, wherein said setting step adjusts a distance to said circumference of the cavity.

6. The method according to claim 1, wherein said setting step fixes a size of each of the protrusions by inserting a bolt in an elongate hole of said adjusting piece.

7. The method according to claim 1, wherein said molding step molds protrusions in at least four gaps.

8. The method according to claim 6, wherein, when the lens molded is greater in outer diameter than a design value, bolts fixing adjusting pieces are respectively loosened to move said adjusting pieces toward a lens center along elongate holes, to absorb the deviation of from the design value.

9. The method according to claim 1, wherein said setting step adjusts an outer diameter for said lens.

10. The method according to claim 1, wherein said lens has a thickness which is smaller in the center region and greater in the circumference.

11. The method according to claim 1, wherein said plastic lens has a diameter of 50 to 60 mm.

12. The method according to claim 1, wherein said plastic lens has a diameter of 50 mm or more.

13. A method for manufacturing a plastic lens, comprising:
injecting a resin material through an injection gate in a circumference of a cavity of fixed size formed between a plurality of mold pieces of predetermined shapes of a metal mold for molding a lens body, into the cavity;

molding protrusions along the lens body circumference in gaps communicating with the cavity, the gaps being formed at points on the circumference of the cavity, the points being in positions different from a gate-formed point; and setting a size of each of the protrusions by previously regulating an adjusting piece located between two of said mold pieces of predetermined shapes, wherein said regulating is performed by moving said adjusting piece with respect to said cavity circumference to change a distance related to a protrusion size.

14. The method according to claim 11, wherein said setting step regulates a plurality of adjusting pieces.

* * * * *